United States Patent
Nigam et al.

(10) Patent No.: US 12,229,136 B2
(45) Date of Patent: Feb. 18, 2025

(54) DYNAMIC CLASSIFICATION AND OPTIMIZATION OF COMPUTING RESOURCE UTILIZATION

(71) Applicant: Cisco Technology, Inc., San Jose, CA (US)

(72) Inventors: Vikas Nigam, Bangalore (IN); Chandan Abhishek, Jharkhand (IN); Rahul Bandari, Telangana (IN)

(73) Assignee: Cisco Technology, Inc., San Jose, CA (US)

(*) Notice: Subject to any disclaimer, the term of this patent is extended or adjusted under 35 U.S.C. 154(b) by 64 days.

(21) Appl. No.: 17/826,444

(22) Filed: May 27, 2022

(65) Prior Publication Data
US 2023/0385279 A1    Nov. 30, 2023

(51) Int. Cl.
*G06F 16/2453* (2019.01)
*G06F 16/28* (2019.01)

(52) U.S. Cl.
CPC ...... *G06F 16/24545* (2019.01); *G06F 16/285* (2019.01)

(58) Field of Classification Search
CPC .......................... G06F 16/24545; G06F 16/285
See application file for complete search history.

(56) References Cited

U.S. PATENT DOCUMENTS

| | | |
|---|---|---|
| 8,341,178 B2 | 12/2012 | Belknap et al. |
| 10,135,693 B2 | 11/2018 | Sharma et al. |
| 10,482,551 B2 * | 11/2019 | Zomet ............ G06Q 50/12 |
| 10,671,507 B2 | 6/2020 | Prabath et al. |
| 10,726,590 B2 | 7/2020 | Nataraj et al. |
| 10,922,206 B2 | 2/2021 | Anand et al. |
| 10,949,108 B2 | 3/2021 | Jain et al. |
| 2003/0149599 A1 * | 8/2003 | Goodall ............ G16H 20/10 705/2 |
| 2004/0249871 A1 * | 12/2004 | Bazoon ............ G06F 16/93 |
| 2014/0040306 A1 * | 2/2014 | Gluzman Peregrine ........... G06F 16/2477 707/769 |
| 2016/0286351 A1 * | 9/2016 | Glenn, III ............ H04W 4/023 |
| 2018/0039708 A1 * | 2/2018 | Gourley ............ G06Q 10/06 |
| 2022/0365839 A1 * | 11/2022 | Baheti ............ G06F 11/0766 |

* cited by examiner

*Primary Examiner* — Mark D Featherstone
*Assistant Examiner* — Brooks T Hale
(74) *Attorney, Agent, or Firm* — BEHMKE INNOVATION GROUP LLC; James M. Behmke; James J. Wong

(57) ABSTRACT

In one embodiment, a process: monitors an access pattern of database objects on a user-connection basis; calculates a wait-time metric for database sessions for the objects; classifies a first number of often-used objects and a second number of not-recently-used objects; classifies the wait-time metric for the database sessions as a wait-time classification that is one of either: an acceptable wait-time metric, a warning-level wait-time metric, or a critical-level wait-time metric; and generates a graphical interface that indicates, for each user-connection pairing of the particular database, an associated wait-time metric and a graphical indication of an associated wait-time classification, as well as an associated first number of often-used objects and an associated second number of not-recently-used objects.

19 Claims, 6 Drawing Sheets

DYNAMIC CLASSIFICATION AND OPTIMIZATION OF COMPUTING RESOURCE UTILIZATION

TECHNICAL FIELD

The present disclosure relates generally to computer systems, and, more particularly, to dynamic classification and optimization of computing resource utilization.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, cloud infrastructure consist of two costly components: compute and block storage. For database (DB) servers in the cloud, for example, both of these components accounts for 70% of overall cost. Not only has it been difficult to determine the storage and access patterns of incoming DB connections, but it has also been difficult to portray in any useful manner or to make appropriate adjustments.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, dynamic classification and optimization of computing resource utilization is provided. In one embodiment, an illustrative method herein may comprise: monitoring, by a process, an access pattern of a plurality of objects in a particular database on a user-connection basis; calculating, by the process, a wait-time metric for database sessions for the plurality of objects on the user-connection basis; classifying, by the process and based on the access pattern, a first number of the plurality of objects in the particular database on the user-connection basis as often-used objects and a second number of the plurality of objects in the particular database on the user-connection basis as not-recently-used objects; classifying, by the process, the wait-time metric for the database sessions on the user-connection basis as a wait-time classification that is one of either: an acceptable wait-time metric, a warning-level wait-time metric, or a critical-level wait-time metric; and generating, by the process, a graphical interface that indicates, for each user-connection pairing of the particular database, an associated wait-time metric and a graphical indication of an associated wait-time classification, as well as an associated first number of often-used objects and an associated second number of not-recently-used objects.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
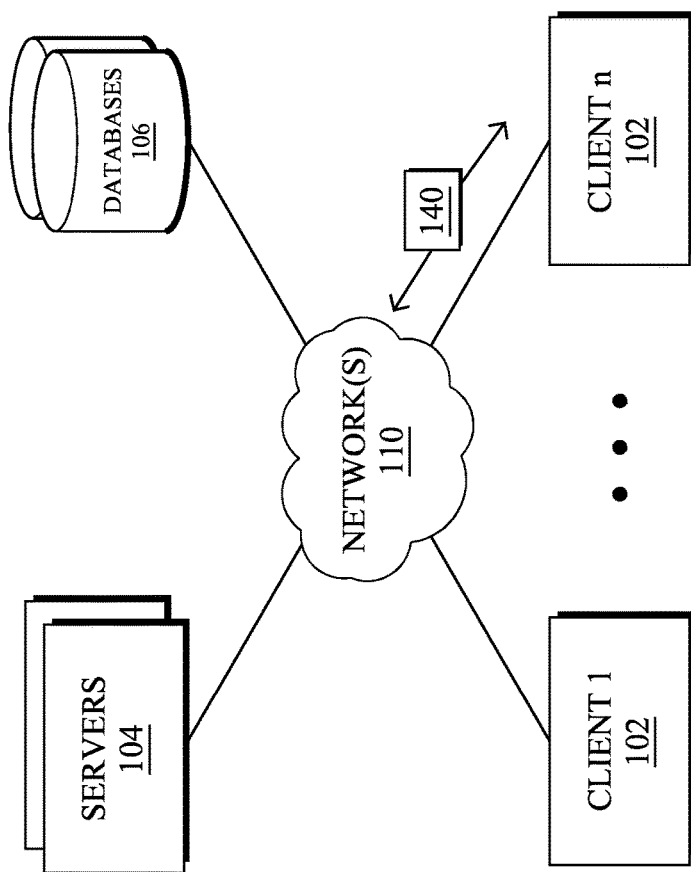
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
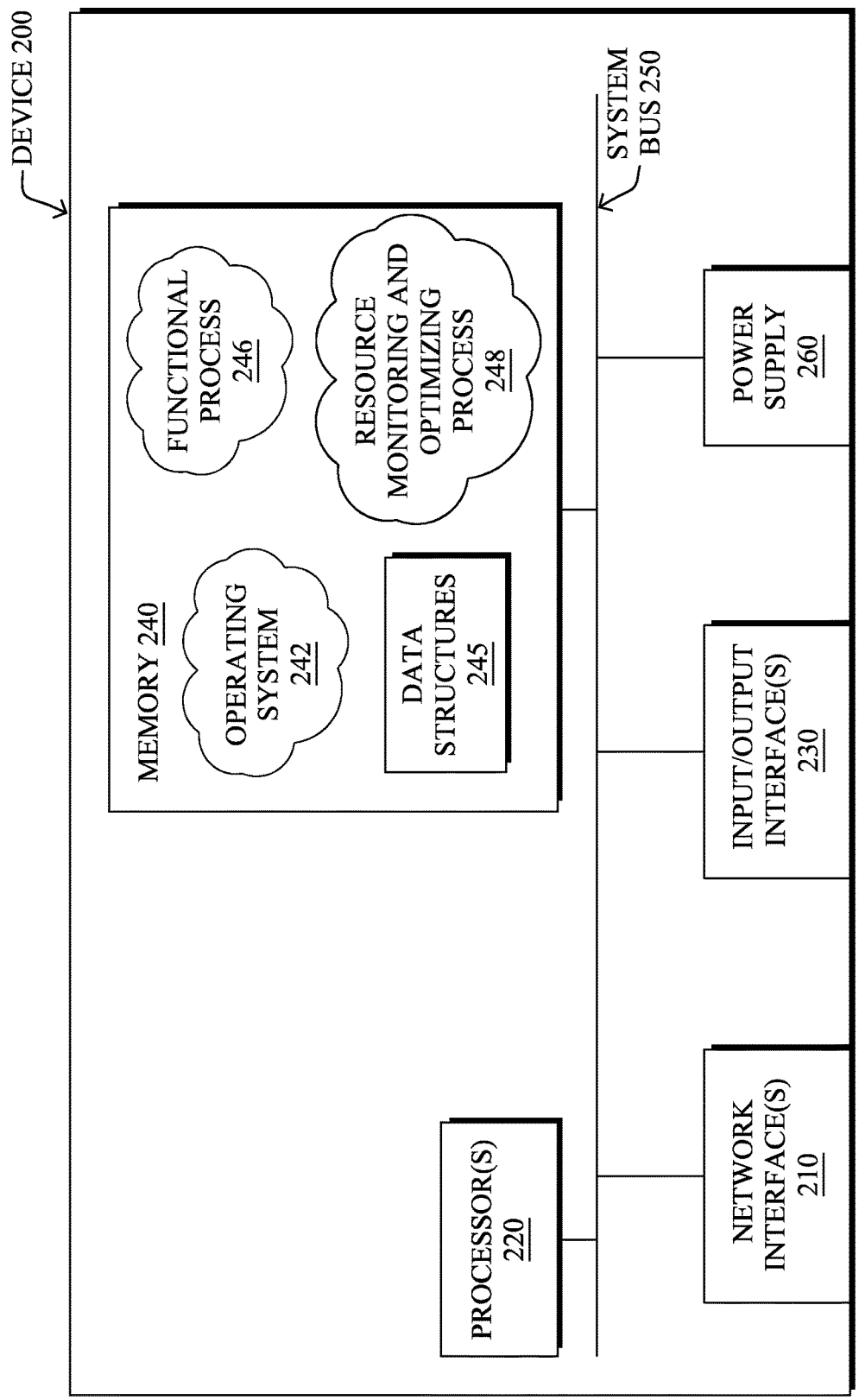
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "resource monitoring and optimizing" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet)

through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
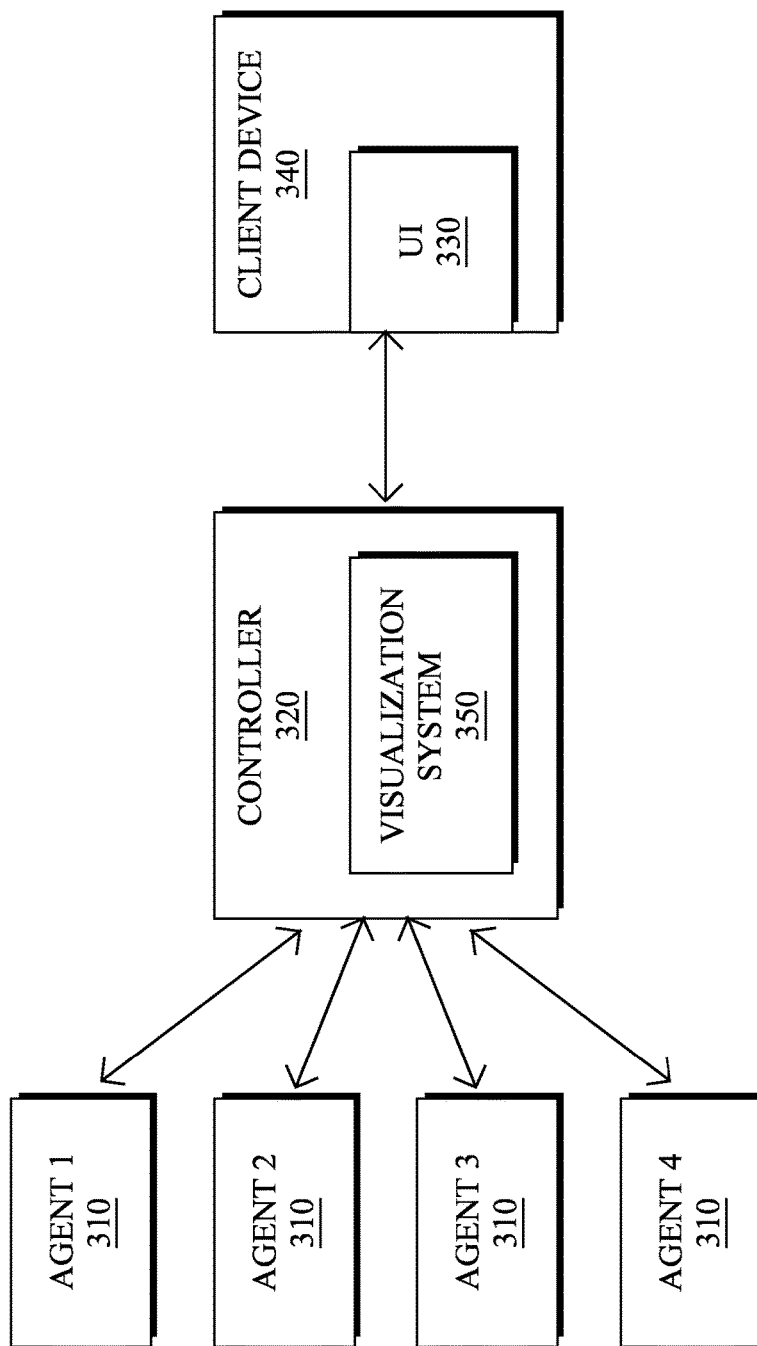
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Classification and Optimization of Resource Utilization—

As noted above, cloud infrastructure consist of two costly components: compute and block storage. For database (DB) servers in the cloud, for example, both of these components accounts for 70% of overall cost. Not only has it been difficult to determine the storage and access patterns of incoming DB connections, but it has also been difficult to portray in any useful manner or to make appropriate adjustments.

In particular, databases, performance is paramount, which can potentially impact the overall application service response time and user experience. Database management systems (DBMS) often are complex with regard to their CPU/IO/Memory, kernel, and application code. Isolating and root cause database performance issues is a time consuming job and can result in impacting mean time to recovery (MTTR) for performance incidents.

The techniques herein, therefore, provide dynamic classification and optimization of computing resource utilization. For example, the techniques herein will help to optimize computing resources (e.g., storage and compute resources) and will provide an intuitive user interface (UI), based on a "heat map" according to "Hot/Warm/Cold" objects. That is, the techniques herein determine and showcase the performance of an overall computing system, e.g., particularly databases (though other systems may use the techniques herein), for each user/connection pair, allowing for simple diagnosis and detection of problems, as well as for alerting admins and/or automated processes to resolve issues before impact is widespread.

Said differently, the techniques described in greater detail below provide performance insights for whole systems (e.g., database wait times, storage utilization, and so on), and isolate the data at each user/connection level. In particular, as described below, the techniques provide the following benefits:

1. Storage optimization by archiving data not used very often and keeping data objects which are referenced very often.
2. Performance index for all the users can be captured based on wait time (WAIT_TIME) for sessions and/or any increase on WAIT_TIME for a specific user.
3. Session wait time metrics can be run through anomaly detection models to identify deviations and raise alarms.
4. User interface can show the whole database performance in one screen and cover all the most important parts for DBMS, such as storage, CPU, IO, etc.
5. If wait time is large or increased or is alerted by anomaly detection models, then it can be considered as an indication of poor performance for a specific user.

The techniques herein, therefore, show the performance of database filtered to the connection and user level, which will help to isolate the issue and let support engineers and/or automated services to identify the problematic sessions, collect all the relevant performance data, and take necessary actions.

Notably, the techniques herein may employ any number of machine learning techniques, such as to classify the collected data and to cluster the data as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

Operationally, the techniques herein may be implemented as a feature within an observability intelligence platform, such as that described above, or may be a standalone product. As noted above, the techniques herein show database performance metric WAIT_TIME and STORAGE utilized by each incoming database connection or database user, and can represent overall database performance metrics along with storage access for each user. (Note that wait-time analysis is an approach that looks at how much time the database spends actually completing operations as opposed to resource optimization, thus may be portrayed as a percentage, a ratio, or actual lengths of time.) This allows isolating and troubleshooting performance issues or incidents for a specific user, which in turn will reduce overall MTTR for application services.

Example metrics that may be used for the feature described herein may be such things as:
  Database storage used by objects such as tables and indexes;
  Access patterns for the above objects based on Structured Query Language (SQL) queries executed by various users in database;
  WaitTime metric for each session (e.g., available in database metadata);
  Etc.

Figure 4:
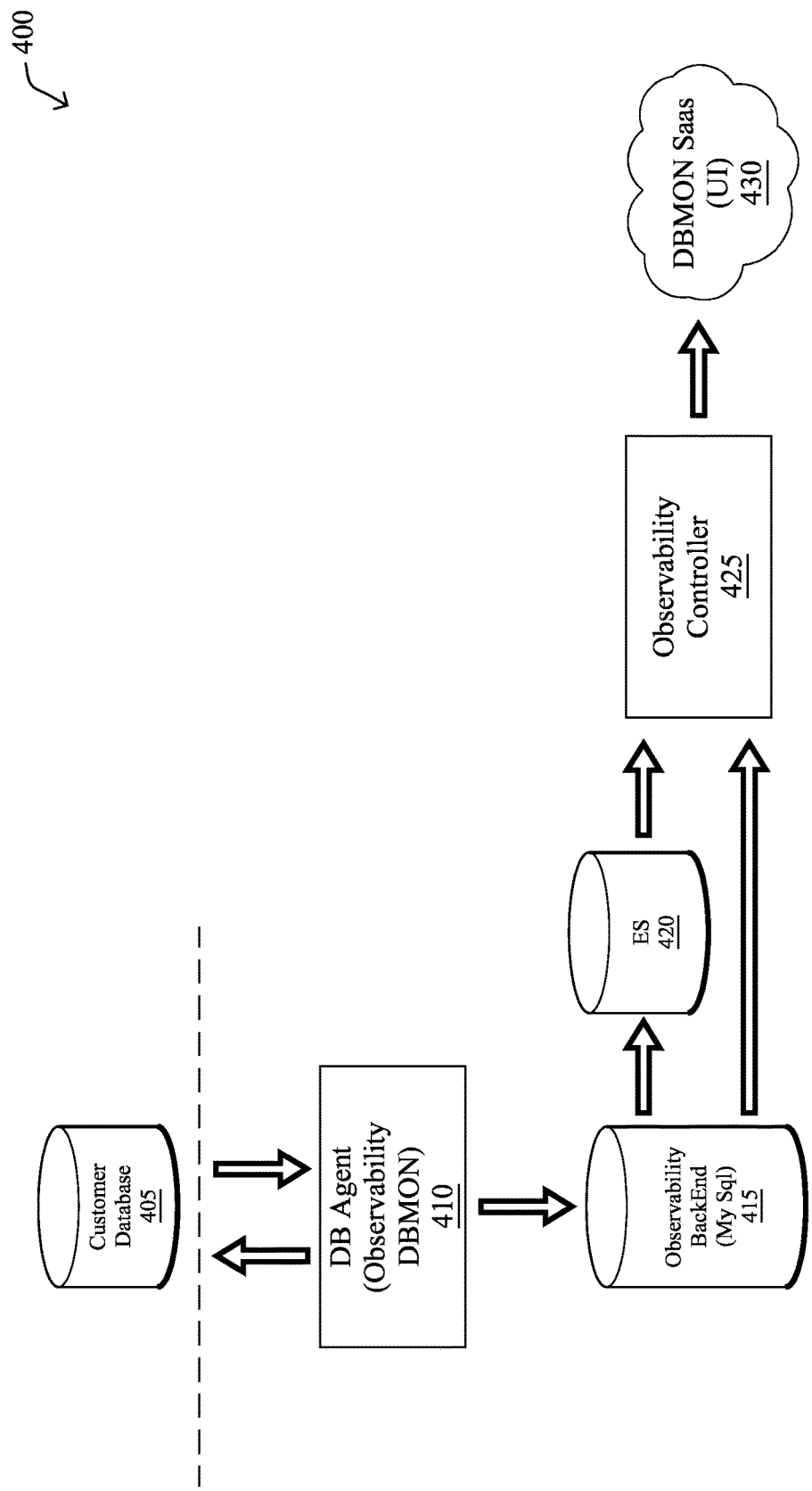
FIG. 4 illustrates an example of a database monitoring (DBMON) architecture design according to one or more embodiments described herein.

FIG. 4 illustrates an example of a database monitoring (DBMON) architecture design 400 according to one or more embodiments of the techniques herein. In particular, as described herein, a DB Agent 410 connects to a Customer Database 405 and collect database metrics and meta data. The DB Agent may hold sampled data in an Observability Backend Store 415 (e.g., MySQL). Metrics data from the Observability Backend may be replicated to Elastic Servers (ES) 420, and the Observability Controller 425 may then read from the ES (Metrics) and the backend (Meta data), and generates a UI (e.g., a DBMON SaaS 430) with monitoring information and data, accordingly.

Figure 5:
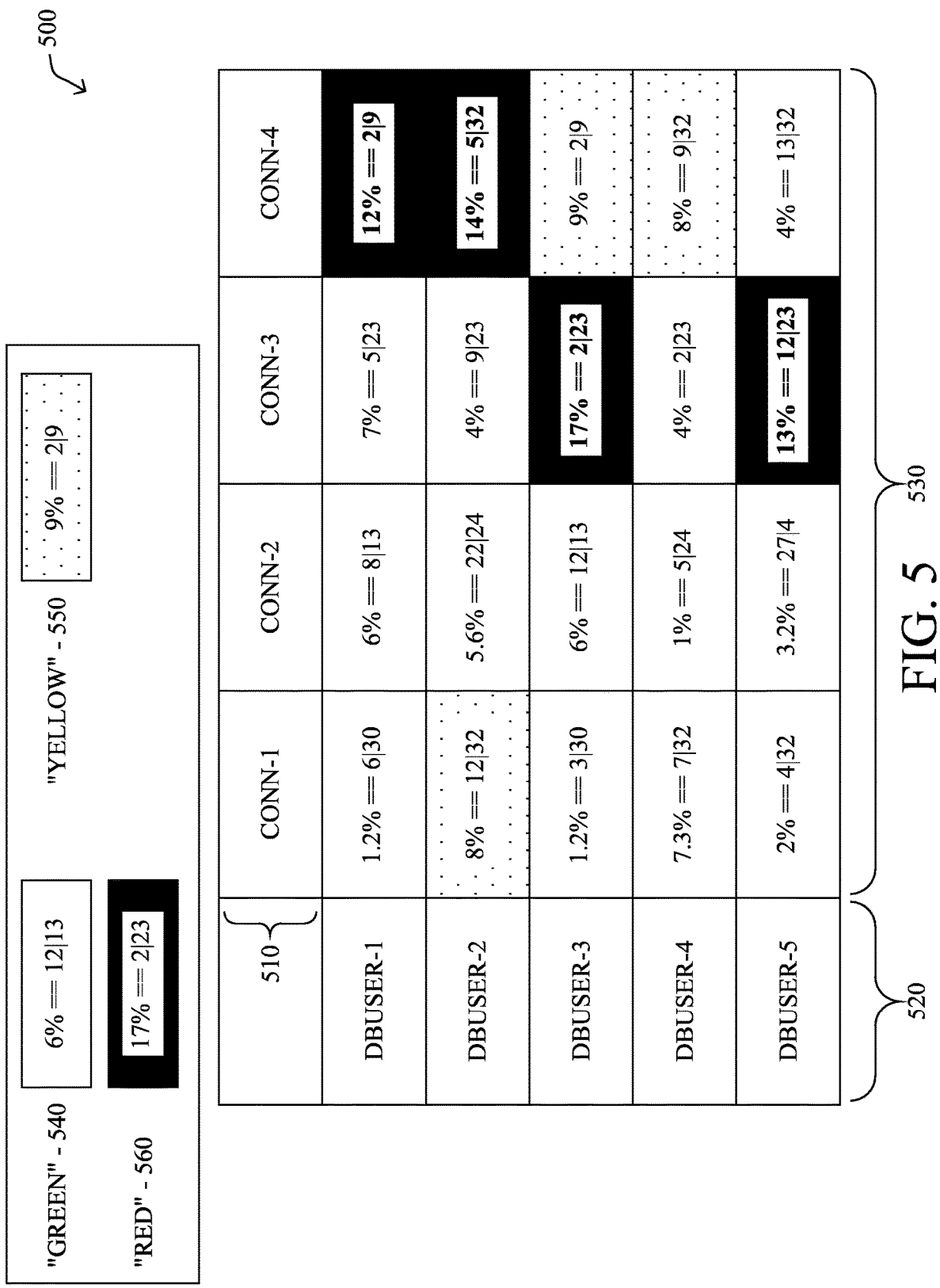
FIG. 5 illustrates an example of a user interface (UI) for dynamic classification of computing resource utilization according to one or more embodiments described herein.

The techniques herein are now described with reference generally to user interface (UI) 500 of FIG. 5. In particular, the database visibility tool/architecture above (DBMON 500) captures the data from customer databases, and the UI 500 displays the data and insights based on the logic as described below. Notably, columns represent incoming DB connections 510 (e.g., "CONN-1", "CONN-2", etc.) at any instant of time or selected period, while rows represent database users 520 (e.g., "DBUSER-1", "DBUSER-2", etc.), using which DB connection has been established. Entries 530 thus contain data representative of specific user/connection pairs.

As shown, and as described in greater detail below, each entry 530 (or cell) of the UI 500 illustrates data in the following example format (other formats may be used herein):
  A percentage "X %", which is representative of the WaitTime for a particular DB connection and DB User, as described below (alternatively, WaitTime may be displayed as an actual length of time);
  A numerical figure "Y|Z" in each cell (e.g., "6|30" for DBUSER-1,Conn-1) is the amount of storage used by "Hot" objects (e.g., 6) and "Cold" objects (e.g., 30), as described below.

With the help of machine learning (ML) based anomaly models, any deviations in performance metrics may be captured (e.g., anomalies, dynamic threshold crossings, etc.), triggering automated proactive alerts or other mitigation actions (e.g., automated correction, distribution, etc.). The dynamic classifications (described below) may be signaled within the UI 500 with appropriate colors or other indicators, such as, for example:
  Green 540: acceptable/OK;
  Yellow 550: Warning;
  Red 560: Critical.

For instance, say, for example, that if the percentage value of a given cell is >=10% then it's bad (Red), if below 10% and above 8% it's at a warning level (Yellow), and below 8% is acceptable (Green). (Any values may be configured or determined, such as through machine learning as noted above, and the values shown herein are merely for illustration.)

The UI 500 with color codes above, or other indicative representations of classifications, will help administrators, or even non-savvy persons, to easily understand the overall database health and any issues proactively. In particular, the intuitive UI enables non DB users to monitor the DB performance and to become alerted (or at least curious) before any potential impact. Notably, other levels of classification may be configured, and other coding, orientation, formatting, and so on, may be used in a user interface according to the techniques herein, and UI 500, particularly in table format, is merely one example that is not meant to be singularly limiting to the scope of the embodiments herein.

As an example of all of the data collected, determined, and displayed, generally to be described in greater detail below, assume that a cell for DBUSER-1/CONN-1 shows "1.2%==6|30", and is Green. This means, generally, that DBUSER-1's connection CONN-1 is acceptable, has a WaitTime amounting to 1.2% of the total time, and 6 Hot storage objects and 30 Cold storage objects (thus archiving these 30 units of "cold: storage will free up that much storage, as described below).

According to the embodiments herein, therefore, the techniques herein collect the needed data for a customer's database, and compute the corresponding metrics. For instance, WaitTime may be calculated as:

$$DBTime - CPUTime = WaitTime \quad \text{Eq. 1.}$$

DBTime is the total time spent by any session or user on database which includes CPUTime and WaitTime. Notably, WaitTime is a universal DB metric used to estimate and judge the performance of database; it's the time spent waiting for IO/CPU or Application/Network, etc. CPUTime is the time spent by the DB session on actual CPU (actual processing time). Dividing by the WaitTime by the DBTime will provide the Percentage value for the WaitTime shown in the UI 500 above:

$$WaitTime/DBTime = Percentage \quad \text{Eq. 2.}$$

As noted above, the techniques herein also represent the total amount of database storage used for DB objects (e.g., Table and Indexes), and how frequently it's been referred. For instance, based on DB object access patterns, as illustratively learned by SQL queries used by various DB connection/DB users, the techniques herein may classify storage into categories.

For instance, data-storage categories based on access patterns may illustratively be as follows:
- Hot Data: A Hot dataset is referenced very often and should be preserved in fast storage (e.g., solid state drives (SSD) or memory);
- Warm Data: A Warm dataset is accessed or referenced less often, and hence it can be stored in slower disks (e.g., low cost); and
- Cold Data: A Cold dataset is one that has not been used at all in the last "N" days, and thus can be migrated into archive storage.

Conversely, database object classification criteria based on usage may illustratively be as follows:
- Identify database objects (e.g., Index, tables, etc.) not in use for the last N days as cold-information;
- Identify database objects used less than 25%-50% in the last N days as warm-information; and
- Identify database objects used more than 50% in the last N days as hot-information.

Machine learning techniques can dynamically create classifications, adjust thresholds for defining "hot/warm/cold", etc., and the techniques herein will thus help to identify HOT/WARM/COLD objects and give insights on storage utilization and/or optimization (e.g., sizing, cost savings, etc.), such as by archiving the cold objects, moving data to faster (or slower and less expensive) storage based on access needs/speeds/frequency, and so on.

In particular, actionable insights that may be achieved based on the techniques herein may comprise such things as:
- Storage Heat Map will help to rearrange objects and optimize DB storage to optimize cost without impacting performance.
- Storage optimization, archiving unwanted DB objects and placing most often used objects on fast storage.

The techniques herein will also indicate and detect the slow performance or any impact on database based on DB Wait-Time Metric (which is universal):
- DBUsers/Application connection facing performance impact.
- Isolate the Performance impact for a specific DB User.
- Identify the top SQLs and Waits for the specific User and fix the same.

The techniques herein also provide optimization through storage/compute capacity planning.

Figure 6:
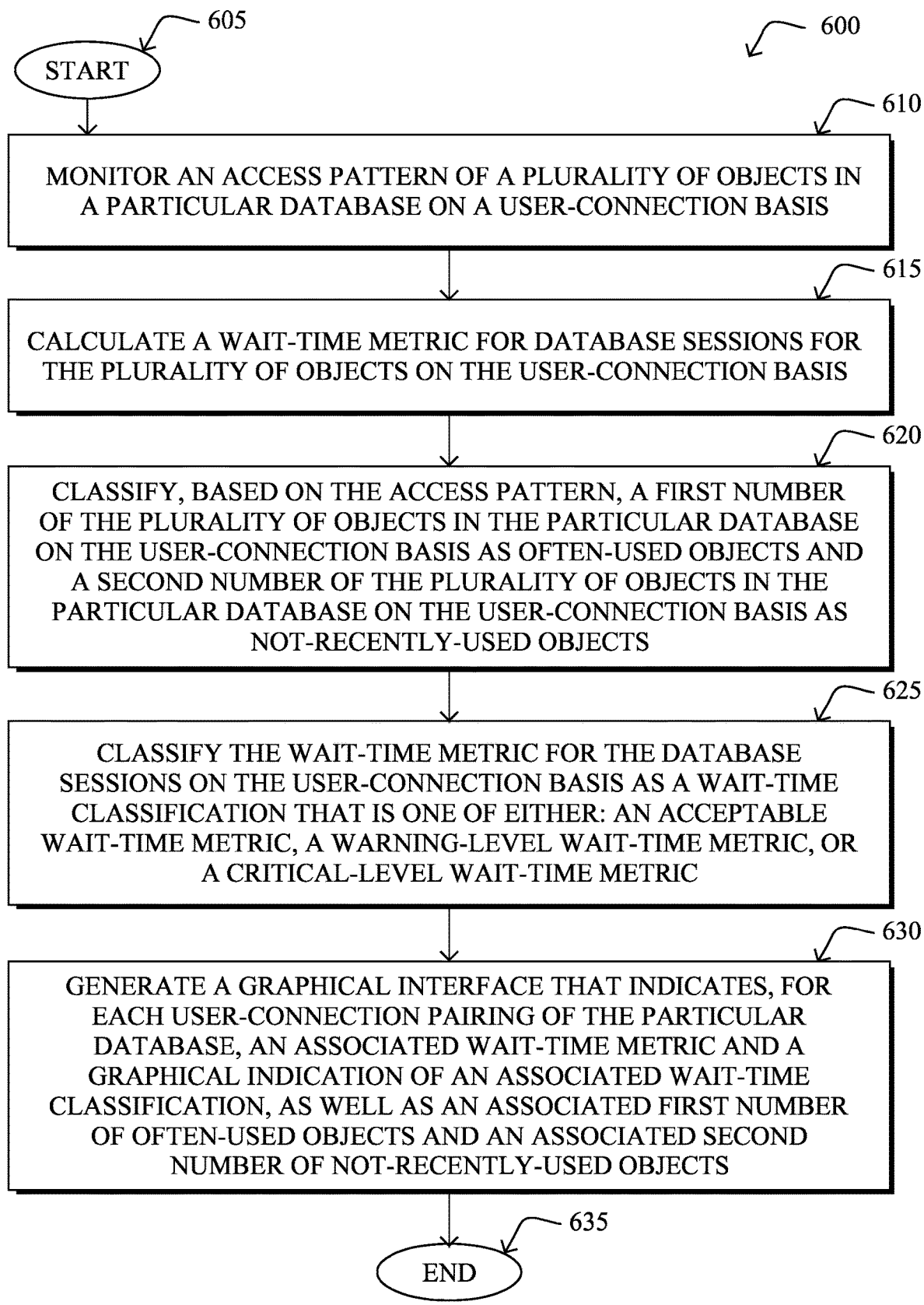
FIG. 6 illustrates an example simplified procedure for dynamic classification and optimization of computing resource utilization in accordance with one or more embodiments described herein.

FIG. 6 illustrates an example simplified procedure for dynamic classification and optimization of computing resource utilization in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, a process monitors an access pattern of a plurality of objects in a particular database on a user-connection basis. Also, in step 615, the process calculates a wait-time metric (e.g., a length of time or a percentage of time) for database sessions for the plurality of objects on the user-connection basis;

According to the techniques herein, in step 620 the process may then classify, based on the access pattern, a first number of the plurality of objects in the particular database on the user-connection basis as often-used objects and a second number of the plurality of objects in the particular database on the user-connection basis as not-recently-used objects. For example, as described herein, classifying the first number of the plurality of objects in the particular database on the user-connection basis as often-used objects may be based on one or both of a user-configurable threshold and a machine-learning-adjustable threshold. (Note also that as described above, the techniques herein may further classify a third number of the plurality of objects in the particular database on the user-connection basis as not-often-used objects.)

In step 625, the process may also classify the wait-time metric for the database sessions on the user-connection basis as a wait-time classification that is one of either: an acceptable wait-time metric, a warning-level wait-time metric, or a critical-level wait-time metric. Again, as noted above, classifying the wait-time metric as the wait-time classification is based on one or both of user-configurable thresholds and machine-learning-adjustable thresholds.

In step 630, the process may then generate a graphical interface that indicates, for each user-connection pairing of the particular database, an associated wait-time metric and a graphical indication of an associated wait-time classification, as well as an associated first number of often-used objects and an associated second number of not-recently-used objects. For example, as shown in the illustration above, the graphical indication of an associated wait-time classification for each user-connection pairing of the particular database comprises: a green coloring for acceptable wait-time metrics; a yellow coloring for warning-level wait-time metrics; and a red coloring for critical-level wait-time metric.

The simplified procedure 600 may then end in step 635, notably with the ability to continue updating the metrics and/or thresholds for classification, as described herein. Other steps may also be included generally within procedure 600. For example, such steps (or, more generally, such additions to steps already specifically illustrated above), may include: triggering a mitigation action in response to a triggering value or behavior of one or more of: the associated wait-time metric; the associated first number of often-used objects; and the associated second number of not-recently-used objects; recommending, on the graphical interface, archival of not-recently-used objects; recommending, on the graphical interface, movement of often-used objects to high-speed storage; defining a time period from which the access pattern and the wait-time metric are based (e.g., based on one or more of manual configuration and machine-learning-based modelling); and so on.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for dynamic classification and optimization of computing resource utilization, specifically with a database performance "heat map" user interface with up-front useful information, as described above. In particular, the techniques herein help to rearrange objects and optimize database storage to optimize performance and utilization, limiting oversized or undersized infrastructures, and optimizing cost without impacting performance. Data usage patterns can be analyzed for actionable insights, identifying resources/objects into various classifications, such as "HOT/WARM/COLD" objects, allowing proper configuration of storage, such as in terms of archiving Cold objects, and increasing performance for Hot objects, future capacity planning, and so on. The techniques herein also help to indicate and detect the slow performance or any impact on the database based on the DB WaitTime Metric, which is universal. Moreover, the techniques herein may help to generate a list of "unwanted" incoming connections based on malicious activity or simply misconfigured connections that over-consume allocated resources. Still further, the illustrative dashboard/UI allows for the relevant information to be provided in a single view for full analysis of complete database activities, helping to easily identify problems and to prevent unwanted usage (e.g., and to save costs).

In still further embodiments of the techniques herein, a business impact of the resource utilization can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the computing resource utilization with various business transactions in order to better understand the effect on the business transactions, accordingly.

Illustratively, the techniques described herein may be performed by hardware, software, and/or firmware, such as in accordance with the illustrative resource monitoring and optimizing process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: monitoring, by a process, an access pattern of a plurality of objects in a particular database on a user-connection basis; calculating, by the process, a wait-time metric for database sessions for the plurality of objects on the user-connection basis; classifying, by the process and based on the access pattern, a first number of the plurality of objects in the particular database on the user-connection basis as often-used objects and a second number of the plurality of objects in the particular database on the user-connection basis as not-recently-used objects; classifying, by the process, the wait-time metric for the database sessions on the user-connection basis as a wait-time classification that is one of either: an acceptable wait-time metric, a warning-level wait-time metric, or a critical-level wait-time metric; and generating, by the process, a graphical interface that indicates, for each user-connection pairing of the particular database, an associated wait-time metric and a graphical indication of an associated wait-time classification, as well as an associated first number of often-used objects and an associated second number of not-recently-used objects.

In one embodiment, the method further comprises: triggering a mitigation action in response to a triggering value or behavior of one or more of: the associated wait-time metric; the associated first number of often-used objects; and the associated second number of not-recently-used objects.

In one embodiment, the method further comprises: recommending, on the graphical interface, archival of not-recently-used objects; and recommending, on the graphical interface, movement of often-used objects to high-speed storage.

In one embodiment, the method further comprises: classifying a third number of the plurality of objects in the particular database on the user-connection basis as not-often-used objects.

In one embodiment, the method further comprises: defining a time period from which the access pattern and the wait-time metric are based. In one embodiment, defining the time period is based on one or more of manual configuration and machine-learning-based modelling.

In one embodiment, the wait-time metric is one of either a length of time or a percentage of time.

In one embodiment, classifying the first number of the plurality of objects in the particular database on the user-connection basis as often-used objects is based on a user-configurable threshold.

In one embodiment, classifying the first number of the plurality of objects in the particular database on the user-connection basis as often-used objects is based on a machine-learning-adjustable threshold.

In one embodiment, classifying the wait-time metric as the wait-time classification is based on user-configurable thresholds.

In one embodiment, classifying the wait-time metric as the wait-time classification is based on is based on machine-learning-adjustable thresholds.

In one embodiment, the graphical indication of an associated wait-time classification for each user-connection pairing of the particular database comprises: a green coloring for acceptable wait-time metrics; a yellow coloring for warning-level wait-time metrics; and a red coloring for critical-level wait-time metric.

According to the embodiments herein, an illustrative tangible, non-transitory, computer-readable medium herein may have computer-executable instructions stored thereon that, when executed by a processor on a computer, may cause the computer to perform a method comprising: monitoring an access pattern of a plurality of objects in a particular database on a user-connection basis; calculating a wait-time metric for database sessions for the plurality of objects on the user-connection basis; classifying, based on the access pattern, a first number of the plurality of objects in the particular database on the user-connection basis as often-used objects and a second number of the plurality of objects in the particular database on the user-connection basis as not-recently-used objects; classifying the wait-time metric for the database sessions on the user-connection basis as a wait-time classification that is one of either: an acceptable wait-time metric, a warning-level wait-time metric, or a critical-level wait-time metric; and generating a graphical interface that indicates, for each user-connection pairing of the particular database, an associated wait-time metric and a graphical indication of an associated wait-time classification, as well as an associated first number of often-used objects and an associated second number of not-recently-used objects.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: monitor an access pattern of a plurality of objects in a particular database on a user-connection basis; calculate a wait-time metric for database sessions for the plurality of objects on the user-connection basis; classify, based on the access pattern, a first number of the plurality of objects in the particular database on the user-connection basis as often-used objects and a second number of the plurality of objects in the particular database on the user-connection basis as not-recently-used objects; classify the wait-time metric for the database sessions on the user-connection basis as a wait-time classification that is one of either: an acceptable wait-time metric, a warning-level wait-time metric, or a critical-level wait-time metric; and generate a graphical interface that indicates, for each user-connection pairing of the particular database, an associated wait-time metric and a graphical indication of an associated wait-time classification, as well as an associated first number of often-used objects and an associated second number of not-recently-used objects.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
monitoring, by a process, an access pattern of a plurality of objects in a particular database on a user-connection basis;
calculating, by the process, a wait-time metric for database sessions for the plurality of objects on the user-connection basis;
classifying, by the process and based on the access pattern, a first number of the plurality of objects in the particular database on the user-connection basis as often-used objects and a second number of the plurality of objects in the particular database on the user-connection basis as not-recently-used objects;
classifying, by the process and based on machine-learning-adjustable thresholds, the wait-time metric for the database sessions on the user-connection basis as a wait-time classification that is one of either: an acceptable wait-time metric, a warning-level wait-time metric, or a critical-level wait-time metric, wherein the machine-learning-adjustable thresholds are dynamically adjusted using an anomaly detection model that is applied to performance metrics of the particular database comprising measurements of total session time, time spent waiting for resources, and processing time; and generating, by the process, a graphical interface that indicates, for each user-connection pairing of the particular database, an associated wait-time metric and a graphical indication of an associated wait-time classification, as well as an associated first number of often-used objects and an associated second number of not-recently-used objects.

2. The method as in claim 1, further comprising:
triggering a mitigation action in response to a triggering value or behavior of one or more of: the associated wait-time metric; the associated first number of often-used objects; and the associated second number of not-recently-used objects.

3. The method as in claim 1, further comprising:
recommending, on the graphical interface, archival of not-recently-used objects; and
recommending, on the graphical interface, movement of often-used objects to high-speed storage.

4. The method as in claim 1, further comprising:
classifying a third number of the plurality of objects in the particular database on the user-connection basis as not-often-used objects.

5. The method as in claim 1, further comprising:
defining a time period from which the access pattern and the wait-time metric are based.

6. The method as in claim 5, wherein defining the time period is based on one or more of manual configuration and machine-learning-based modelling.

7. The method as in claim 1, wherein the wait-time metric is one of either a length of time or a percentage of time.

8. The method as in claim 1, wherein classifying the first number of the plurality of objects in the particular database on the user-connection basis as often-used objects is based on a user-configurable threshold.

9. The method as in claim 1, wherein classifying the first number of the plurality of objects in the particular database on the user-connection basis as often-used objects is based on a machine-learning-adjustable threshold.

10. The method as in claim 1, wherein classifying the wait-time metric as the wait-time classification is based on user-configurable thresholds.

11. The method as in claim 1, wherein the graphical indication of an associated wait-time classification for each user-connection pairing of the particular database comprises:
a green coloring for acceptable wait-time metrics;
a yellow coloring for warning-level wait-time metrics; and
a red coloring for critical-level wait-time metric.

12. A tangible, non-transitory, computer-readable medium having computer-executable instructions stored thereon that, when executed by a processor on a computer, cause the computer to perform a method comprising:
monitoring an access pattern of a plurality of objects in a particular database on a user-connection basis;
calculating a wait-time metric for database sessions for the plurality of objects on the user-connection basis;
classifying, based on the access pattern, a first number of the plurality of objects in the particular database on the user-connection basis as often-used objects and a second number of the plurality of objects in the particular database on the user-connection basis as not-recently-used objects;
classifying, based on machine-learning-adjustable thresholds, the wait-time metric for the database sessions on the user-connection basis as a wait-time classification that is one of either: an acceptable wait-time metric, a warning-level wait-time metric, or a critical-level wait-time metric, wherein the machine-learning-adjustable thresholds are dynamically adjusted using an anomaly detection model that is applied to performance metrics of the particular database comprising measurements of total session time, time spent waiting for resources, and processing time; and
generating a graphical interface that indicates, for each user-connection pairing of the particular database, an associated wait-time metric and a graphical indication of an associated wait-time classification, as well as an associated first number of often-used objects and an associated second number of not-recently-used objects.

13. The tangible, non-transitory, computer-readable medium as in claim 12, wherein the method further comprises:
triggering a mitigation action in response to a triggering value or behavior of one or more of: the associated wait-time metric; the associated first number of often-used objects; and the associated second number of not-recently-used objects.

14. The tangible, non-transitory, computer-readable medium as in claim 12, wherein the method further comprises:
recommending, on the graphical interface, archival of not-recently-used objects; and
recommending, on the graphical interface, movement of often-used objects to high-speed storage.

15. The tangible, non-transitory, computer-readable medium as in claim 12, wherein the method further comprises:
classifying a third number of the plurality of objects in the particular database on the user-connection basis as not-often-used objects.

16. The tangible, non-transitory, computer-readable medium as in claim 12, wherein the method further comprises:
defining a time period from which the access pattern and the wait-time metric are based, wherein the time period is based on one or more of manual configuration and machine-learning-based modelling.

17. The tangible, non-transitory, computer-readable medium as in claim 12, wherein classifying the first number of the plurality of objects in the particular database on the user-connection basis as often-used objects is based on one or both of a user-configurable threshold and a machine-learning-adjustable threshold.

18. The tangible, non-transitory, computer-readable medium as in claim 12, wherein classifying the wait-time metric as the wait-time classification is based on one or both of user-configurable thresholds and machine-learning-adjustable thresholds.

19. An apparatus, comprising:
one or more network interfaces to communicate with a network;
a processor coupled to the one or more network interfaces and configured to execute one or more processes; and a memory configured to store a process that is executable by the processor, the process, when executed, configured to:
  monitor an access pattern of a plurality of objects in a particular database on a user-connection basis;
  calculate a wait-time metric for database sessions for the plurality of objects on the user-connection basis;
  classify, based on the access pattern, a first number of the plurality of objects in the particular database on the user-connection basis as often-used objects and a second number of the plurality of objects in the particular database on the user-connection basis as not-recently-used objects;
  classify, based on machine-learning-adjustable thresholds, the wait-time metric for the database sessions on the user-connection basis as a wait-time classification that is one of either: an acceptable wait-time metric, a warning-level wait-time metric, or a critical-level wait-time metric, wherein the machine-learning-adjustable thresholds are dynamically adjusted using an anomaly detection model that is applied to performance metrics of the particular database comprising measurements of total session time, time spent waiting for resources, and processing time; and
  generate a graphical interface that indicates, for each user-connection pairing of the particular database, an associated wait-time metric and a graphical indication of an associated wait-time classification, as well as an associated first number of often-used objects and an associated second number of not-recently-used objects.

* * * * *

UNITED STATES PATENT AND TRADEMARK OFFICE
CERTIFICATE OF CORRECTION

| | | |
|---|---|---|
| PATENT NO. | : 12,229,136 B2 | Page 1 of 1 |
| APPLICATION NO. | : 17/826444 | |
| DATED | : February 18, 2025 | |
| INVENTOR(S) | : Vikas Nigam et al. | |

It is certified that error appears in the above-identified patent and that said Letters Patent is hereby corrected as shown below:

In the Specification

Column 9, Line 62 please amend as shown:
CPU/IO/Memory, kernel, and application code. Isolating Column 10, Line 3 please amend as shown:
resources) and will provide an intuitive user interface (UI), Signed and Sealed this
Twenty-seventh Day of May, 2025

Coke Morgan Stewart
*Acting Director of the United States Patent and Trademark Office*